(12) United States Patent
Gardes et al.

(10) Patent No.: US 11,255,293 B2
(45) Date of Patent: Feb. 22, 2022

(54) TURBOFAN COMPRISING A NACELLE EQUIPPED WITH A REVERSER SYSTEM AND A MOBILE CASCADE GRILL

(71) Applicant: Airbus Operations SAS, Toulouse (FR)

(72) Inventors: Pascal Gardes, Levignac (FR); Frédéric Ridray, L'isle Jourdain (FR); Benoit Orteu, Toulouse (FR); Pascal Gougeon, Bouloc (FR); Frédéric Piard, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 16/832,344

(22) Filed: Mar. 27, 2020

(65) Prior Publication Data
US 2020/0318574 A1 Oct. 8, 2020

(30) Foreign Application Priority Data
Apr. 4, 2019 (FR) .................................. 1903630

(51) Int. Cl.
*F02K 1/72* (2006.01)
(52) U.S. Cl.
CPC .......... *F02K 1/72* (2013.01); *F05D 2220/323* (2013.01)
(58) Field of Classification Search
CPC ............................. F02K 1/72; F05D 2220/323
See application file for complete search history.

(56) References Cited

U.S. PATENT DOCUMENTS

| 3,829,020 | A | * | 8/1974 | Stearns | F02K 1/827 239/265.13 |
| 4,716,724 | A | * | 1/1988 | Newton | F02K 1/72 239/265.29 |
| 8,793,973 | B2 | * | 8/2014 | Vauchel | F02K 1/72 60/226.2 |
| 9,140,211 | B2 | * | 9/2015 | Metezeau | F02K 1/827 |
| 10,041,443 | B2 | * | 8/2018 | Foutch | F02K 1/70 |
| 10,428,764 | B2 | * | 10/2019 | Crawford | F02K 1/72 |
| 10,648,427 | B2 | * | 5/2020 | Sawyers-Abbott | F02K 1/72 |

(Continued)

OTHER PUBLICATIONS

French Search Report; priority document for French application 1903630, dated Dec. 4, 2019.

*Primary Examiner* — Lorne E Meade
(74) *Attorney, Agent, or Firm* — Greer, Bruns & Crain, Ltd.

(57) ABSTRACT

A turbofan with a secondary duct and including a fixed structure and a mobile assembly including a frame with openwork regions. The mobile assembly is translatable between advanced and extended positions. The openwork regions are positioned across the window in the extended position. A plurality of blocking doors is provided, each being mobile between stowed and deployed positions. An array of rams move the mobile assembly. A cascade grille mounts on the frame across the openwork region. The grille slides on the frame parallel to the translational direction. For each grille, a rear stop limits rearward movement, and a compression spring pushes the grille to the rear for abutment against a rear stop. For each grille, the fixed structure comprises a stop element against which the grille abuts upon movement from the advanced position to the extended position.

5 Claims, 5 Drawing Sheets

(56) References Cited

U.S. PATENT DOCUMENTS

| | | | |
|---|---|---|---|
| 10,655,564 B2 * | 5/2020 | Gormley | ................. F02K 1/763 |
| 2016/0363097 A1 | 12/2016 | Foutch | |
| 2017/0226962 A1 | 8/2017 | Crawford | |
| 2017/0328304 A1 | 11/2017 | Gormley | |

* cited by examiner

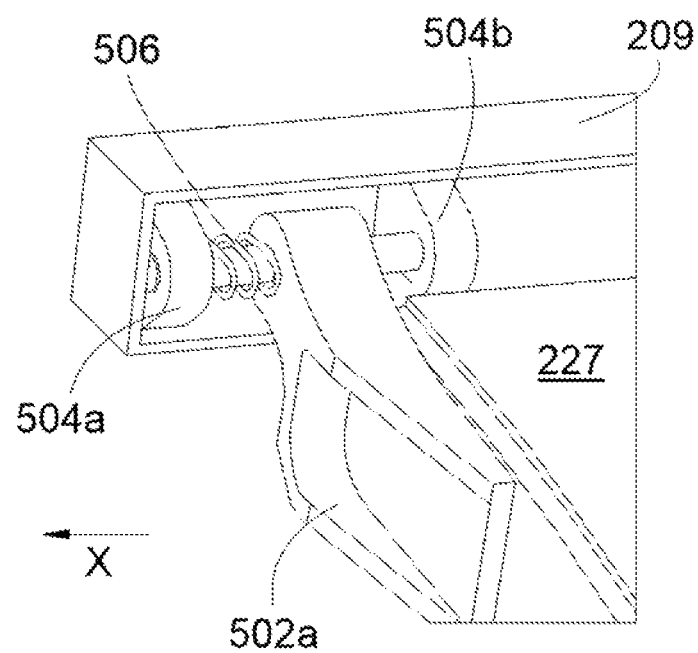

TURBOFAN COMPRISING A NACELLE EQUIPPED WITH A REVERSER SYSTEM AND A MOBILE CASCADE GRILL

CROSS-REFERENCES TO RELATED APPLICATIONS

This application claims the benefit of the French patent application No. 1903630 filed on Apr. 4, 2019, the entire disclosures of which are incorporated herein by way of reference.

FIELD OF THE INVENTION

The present invention relates to a turbofan that comprises a nacelle equipped with a reverse system and a mobile cascade grille, and also to an aircraft comprising at least one such turbofan.

BACKGROUND OF THE INVENTION

An aircraft includes a fuselage, to each side of which is fixed a wing. Under each wing is suspended at least one turbofan that consists, from front to rear, of an air intake, a fan, a motor core and an exhaust nozzle. The air drawn in by the fan enters via the air intake and splits into a primary flow that passes through the motor core and a secondary flow that flows around the motor core in a secondary duct provided for that purpose. The two flows meet before being ejected through the exhaust nozzle.

Each turbofan is fixed under the wing by means of a pylon fixed between the structure of the wing and the structure of the turbofan.

The turbofan comprises the motor core and a nacelle attached around the motor so that between them they delimit the secondary duct and form the fan cowl.

The nacelle comprises a fixed assembly that is arranged at the front and includes, in particular, the fan cowl and a mobile assembly that is arranged at the rear of the fixed assembly and is mobile in translation from an advanced position, in which the mobile assembly adjoins the fixed assembly, and an extended position, in which the mobile assembly is extended relative to the fixed assembly so as to open a window between them, this window being open between the secondary duct and the exterior of the nacelle.

The nacelle comprises a reverser system that comprises a plurality of blocking doors fixed to the mobile assembly, wherein each one is mobile between a stowed position, in which it is not across the secondary duct, and a deployed position, in which it is positioned across the secondary duct so as to direct the secondary flow to the window opened up by the movement of the mobile assembly.

The mobile assembly also bears a cascade grille bearing deflectors that, in the extended position, are positioned across the opening such as better to orient the secondary flow toward the exterior.

The mobile assembly is moved in translation by rams fixed between the fixed assembly and the mobile assembly.

In the extended and deployed positions, the rams have to offset the stresses generated by thrust reversal, i.e., stresses exerted on the cascade grille and the blocking doors. It is thus necessary to install large rams that are able to take up these stresses, which is detrimental from the standpoint of weight and overall bulk.

There is therefore a need to seek a different arrangement that allows the size of the rams to be reduced.

SUMMARY OF THE INVENTION

An object of the present invention is to propose a turbofan that comprises a nacelle equipped with a reverser system and a mobile cascade grille that moves between two extreme positions, ensuring a portion of the transmission of the thrust-reversal stresses.

To that end, a turbofan is proposed that comprises a motor and a nacelle, surrounding the motor, and wherein a secondary duct for a secondary flow is delimited between the nacelle and the motor, the nacelle comprising:

a fan casing comprising an exterior wall, a fixed assembly comprising a fixed structure, integral with the fan casing, a mobile assembly comprising a mobile structure on which are fixed a mobile cowl and a frame having openwork regions to the front of the mobile cowl, the mobile structure being mobile in translation on the fixed structure in a direction of translation between an advanced position in which the mobile structure is positioned such that the mobile cowl is moved close to and extends the exterior wall, and an extended position in which the mobile structure is positioned such that the mobile cowl is moved away to the rear of the exterior wall so as to open a window between the secondary duct and the exterior of the nacelle, wherein the openwork regions are positioned across the window in the extended position, a plurality of blocking doors, wherein each is mounted to be mobile on the mobile structure between a stowed position in which the blocking door is outside the secondary duct and a deployed position in which the blocking door extends across the secondary duct, an array of rams provided to move the mobile structure in translation from the advanced position to the extended position, and vice versa, wherein the extended position corresponds to an abutment of the rams, at least one cascade grille mounted on the frame and arranged across the openwork region, wherein the, or each, cascade grille is mounted to slide on the frame parallel to the direction of translation between two stops, for each cascade grille, at least one front stop limiting the movement of the cascade grille to the front and at least one rear stop limiting the movement of the cascade grille to the rear, for each cascade grille, at least one compression spring that pushes back the cascade grille to the rear for abutment against a rear stop, and for each cascade grille, the fixed structure comprises at least one stop element against which the cascade grille abuts upon movement from the advanced position to the extended position, and wherein the, or each, stop element is arranged to guarantee a functional clearance between the cascade grille and the associated front stop, even when the mobile structure reaches the extended position.

Such a turbofan makes it possible to reduce the dimension of the rams since, in the extended and deployed positions, a portion of the stresses is transmitted through the cascade grille directly toward the fixed assembly and the fan casing and the other portion over the fixed assembly via the stops of the rams.

Advantageously, the cascade grille comprises two front slides and two rear slides distributed at the four corners of the cascade grille and mounted to slide on the frame, and in that each slide is mounted to slide between a front stop arranged at the front relative to the slide and a rear stop arranged to the rear relative to the slide.

Advantageously, the link between each slide and the frame has the form of a clevis, the U-walls of which form the stops.

Advantageously, for each front slide, the compression spring is arranged between the front stop and the front slide.

The invention also proposes an aircraft comprising at least one turbofan according to one of the preceding variants.

BRIEF DESCRIPTION OF THE DRAWINGS

The above-mentioned features of the invention, along with others, will become more clearly apparent on reading the following description of one exemplary embodiment, the description being given with reference to the appended drawings, in which:

FIG. 6 is a perspective view of a detail of an embodiment of the invention.

DETAILED DESCRIPTION OF THE PREFERRED EMBODIMENTS

In the following description, terms relating to a position are considered with reference to the direction of forward movement of the aircraft.

Figure 1:
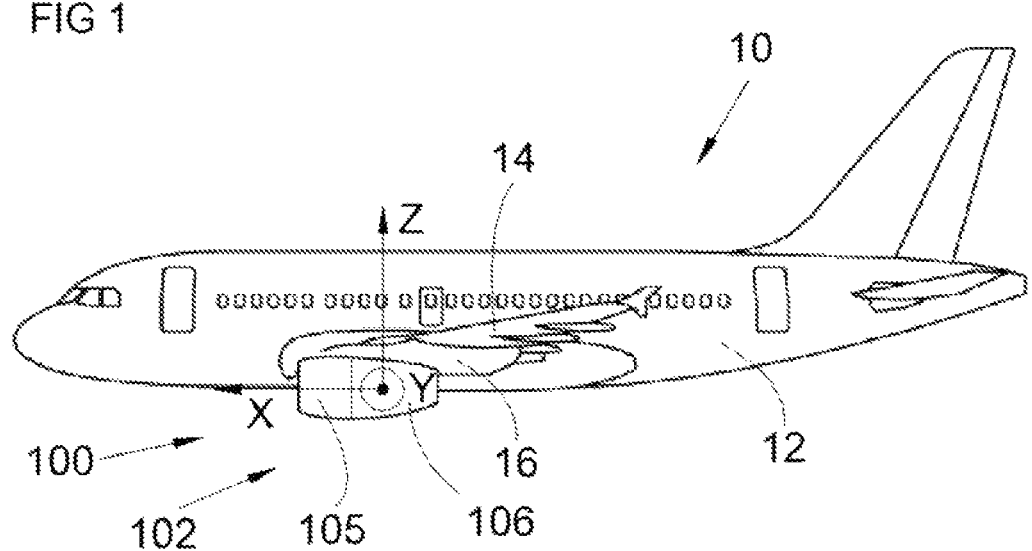
FIG. 1 is a side view of an aircraft comprising a turbofan according to the invention.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

The turbofan 100 has a nacelle 102 and a motor that is housed inside the nacelle 102 in the form of a motor core, a secondary duct being delimited between the motor core and the nacelle 102.

The nacelle 102 comprises a fixed assembly 105 and a mobile assembly 106 that is arranged at the rear of the fixed assembly 105 and is mobile in translation between an advanced position, in which the mobile assembly 106 adjoins the fixed assembly 105, and an extended position, in which the mobile assembly 106 is extended relative to the fixed assembly 105 so as to open a window between them, this window being open between the secondary duct and the exterior of the nacelle 102.

In the following description, and by convention, X denotes the longitudinal axis of the turbofan 100 that is parallel to the longitudinal axis of the aircraft 10 oriented positively toward the front of the aircraft 10, Y denotes the transverse axis that is horizontal when the aircraft is on the ground, and Z denotes the vertical axis, these three directions X, Y and Z being mutually orthogonal.

Figure 2:
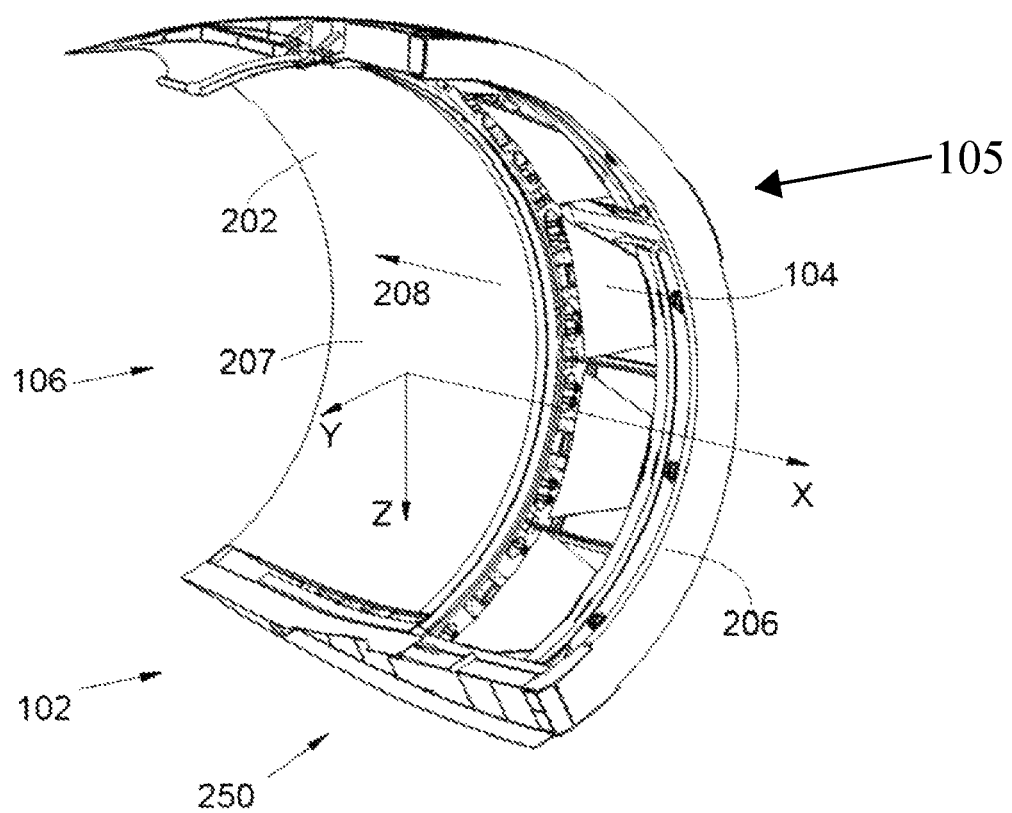
FIG. 2 is a perspective view from the interior of a part of a nacelle of the turbofan according to a particular embodiment of the invention.
Figure 3:
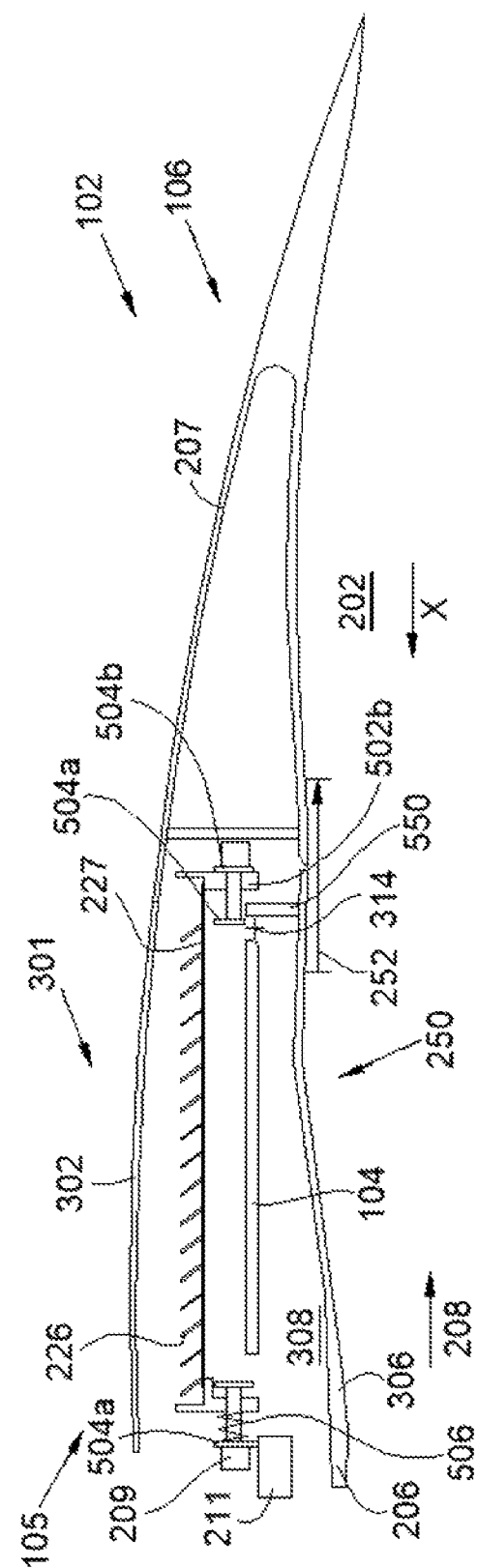
FIG. 3 is a schematic sectional representation of a turbofan according to the invention in the advanced and stowed position.
Figure 4:
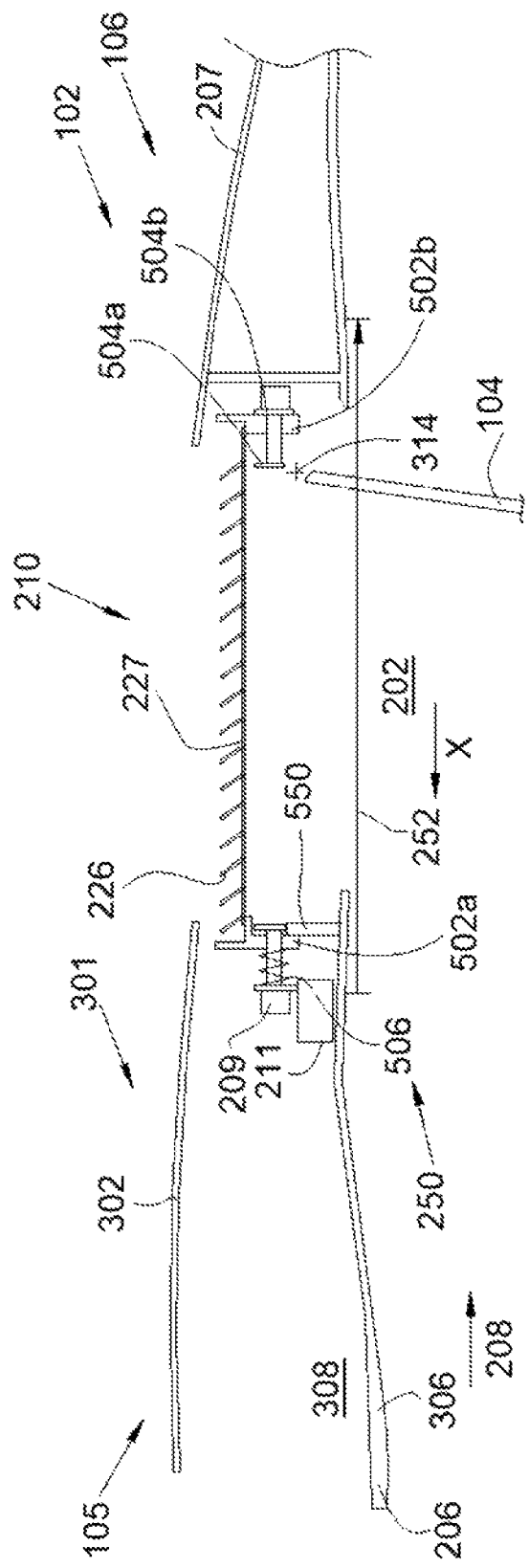
FIG. 4 is a representation similar to that of FIG. 3, in an intermediate position.
Figure 5:
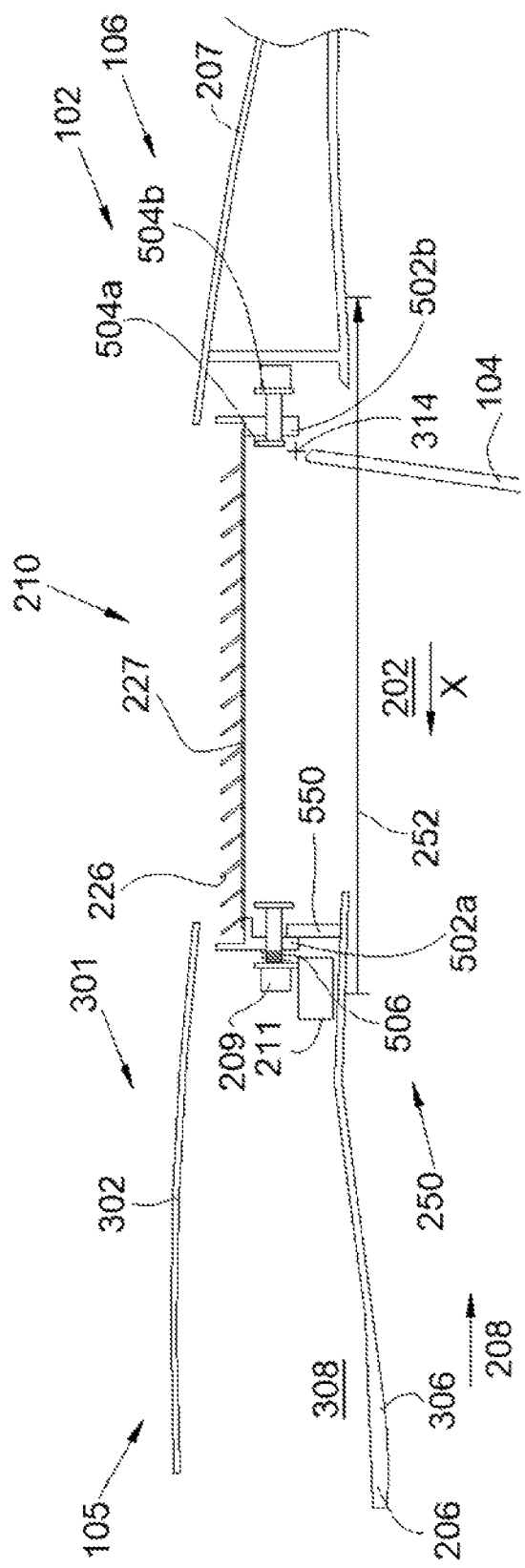
FIG. 5 is a representation similar to that of FIG. 3, in the extended and deployed position.

FIG. 2 shows a part of the nacelle 102 and FIGS. 3 to 5 show three positions of a reverser system 250 of the nacelle 102.

The turbofan 100 has, between the nacelle 102 and the motor, the secondary duct 202 in which flows the secondary flow 208 coming from the air intake and through the fan, and which therefore flows in the flow direction from front to rear of the nacelle 102.

The fixed assembly 105 has a fixed structure 206 mounted fixed on a fan casing 301.

The mobile assembly 106 comprises a mobile structure 211 on which are fixed a mobile cowl 207 forming the exterior walls of the nozzle and a frame 209. The frame 209 comprises openwork regions and in this case has the form of a cylinder. The mobile cowl 207 is at the rear of the frame 209.

The mobile structure 211 is mounted mobile in translation in a translational direction coinciding with the longitudinal axis X on the fixed structure 206 of the nacelle 102.

The fan casing 301 comprises an exterior wall 302 that forms the exterior surface of the nacelle 102 and an interior wall 306 that forms the exterior wall of the secondary duct 202.

The mobile assembly 106, and therefore the mobile structure 211, are mobile between the advanced position (FIG. 3) and the extended position (FIG. 5), and vice versa. FIG. 4 shows an intermediate position.

In the advanced position, the mobile structure 211 is positioned as far forward as possible relative to the longitudinal axis X in such a manner that the mobile cowl 207 is close to and extends the exterior wall 302 so as to define an aerodynamic exterior surface.

In the extended position, the mobile structure 211 is positioned as far to the rear as possible relative to the fan casing 301 in such a manner that the mobile cowl 207 is moved away to the rear of the exterior wall 302 so as to open the window 210 between the secondary duct 202 and the exterior of the nacelle 102. That is to say, the air from the secondary flow 208 passes through the window 210 to end up outside the turbofan 100.

The window 210 is formed through the openwork regions provided in the frame 209, i.e., the openwork regions are positioned across the window 210 in the extended position.

The exterior wall 302 delimits the window 210 at the front relative to the longitudinal axis X, and the mobile cowl 207 delimits the window 210 at the rear relative to the longitudinal axis X.

The translation of the mobile assembly 106 is brought about by any appropriate slideway system such as, for example, slideways between the fixed structure 206 and the mobile structure 211. The mobile structure 211 is made to move by means of an array of rams of appropriate type controlled by a control unit, for example of the processor type, which commands movements in one direction or another depending on the requirements of the aircraft 10. Each ram may, for example, be in the form of an electric ball jack or any other appropriate type of jack. A ram is represented schematically by the arrow referenced 252, and the ram 252 is mounted between the fixed structure 206 and the mobile assembly 106.

The mobile assembly 106 comprises a plurality of blocking doors 104 distributed inside the nacelle 102 around the motor and over the periphery as a function of the angular opening of the window 210 about the longitudinal axis X.

Each blocking door 104 is mounted to move on the mobile structure 211 between a stowed position (FIG. 3) and a deployed position (FIGS. 4 and 5), and vice versa. Passage from the stowed position to the deployed position is brought about by rotation of the blocking door 104 toward the interior of the turbofan 100, about an axis 314 of rotation. Articulation is, here, along a rear edge of the blocking door 104 while the front edge of the blocking door 104 moves.

Naturally, the movement of the blocking doors 104 from the stowed position to the deployed position may take place in another way. For example, the blocking doors may be arranged in a plane perpendicular to the longitudinal axis X and rotation is about an axis parallel to the longitudinal axis X. In the stowed position, the blocking doors are stowed on the periphery of the secondary duct 202 and, in the deployed position, they are placed across the secondary duct 202.

The stowed position of the blocking doors 104 may be adopted when the mobile assembly 106 is in the advanced position or the extended position. The deployed position of the blocking doors 104 may not be adopted when the mobile assembly 106 is in the advanced position.

In the stowed position, each blocking door 104 is outside the secondary duct 202. In the deployed position, each blocking door 104 extends toward the motor, i.e., across the secondary duct 202 and orients the secondary flow 208 toward the exterior through the window 210 in such a manner as to create a counter-thrust.

With a view to better controlling the secondary flow 208 exiting the window 210, the nacelle 102 comprises at least one cascade grille 227 bearing deflectors 226. The cascade grille 227 is mounted on the frame 209 and arranged across the openwork region of the frame 209.

In the embodiment of the invention presented here, the exterior wall 302 and the interior wall 306 between them define a compartment 308 in which the frame 209 and the blocking doors 104 are accommodated when the mobile assembly 106 is in the advanced position. In the extended position, the frame 209 and the blocking doors 104 leave the compartment 308.

FIG. 6 shows an assembly detail of the cascade grille 227 that is mounted to slide on the frame 209 parallel to the translational direction. The cascade grille 227 is thus able to move freely parallel to the translational direction between two extreme positions.

The cascade grille 227 comprises four slides 502a-b distributed at the four corners of the cascade grille 227 and mounted to slide on the frame 209. There are thus two front slides 502a and two rear slides 502b. FIG. 6 shows a front slide 502a.

Each slide 502a-b is mounted to slide between two stops 504a-b corresponding to the two extreme positions. Thus, for each cascade grille 227, the nacelle 102 has at least one front stop 504a limiting the movement of the cascade grille 227 to the front and at least one rear stop 504b limiting the movement of the cascade grille 227 to the rear.

For each slide 502a-b, in particular the rear slides 502b, there is a front stop 504a arranged to the front relative to the slide 502a-b and a rear stop 504b arranged to the rear relative to the slide 502a-b.

In the embodiment of the invention presented in FIG. 6, the link between each slide 502a-b and the frame 209 has the form of a clevis, the U-walls of which form the stops 504a-b. Each slide 502a-b is thus free in translation parallel to the translational direction.

For each cascade grille 227, the fixed structure 206 also comprises at least one stop element 550. The cascade grille 227 abuts against the, or each, stop element 550 before the mobile structure 211 reaches the extended position.

For each front slide 502a, the nacelle 102 also comprises a compression spring 506 arranged between the front stop 504a and the associated slide, in this case the front slide 502a. The compression spring 506 prevents the vibrations from the cascade grille 227 and, in the advanced position, the compression of the compression spring 506 allows the abutment of the cascade grille 227 via at least slides, in this case the rear slide 502b, against the associated rear stop 504b. According to another embodiment, the compression spring 506 may be arranged between the rear slide 502b and the associated front stop 504a.

Generally speaking, for each cascade grille 227, the nacelle 102 also comprises at least one compression spring 506 that pushes back the cascade grille 227 to the rear for abutment against a rear stop 504a-b.

Thus, upon movement of the mobile assembly 106 from the advanced position, the cascade grille 227 is not rigidly linked to the frame 209 and is therefore able to be positioned freely as a function of the stresses to which it is subjected, and these stresses are not transmitted to the rams that move the mobile assembly 106.

When the cascade grille 227 abuts against the, or each, stop element 550, the cascade grille 227 is halted. This position corresponds to the intermediate position shown in FIG. 4.

The mobile assembly 106 continues to move towards the extended position, but the cascade grille 227 remains stationary against the, or each, stop element 550 and the movement of the mobile assembly 106 continues until each ram 252 comes into abutment via a mechanical stop inside the ram 252. As a result, each compression spring 506 is then compressed. The extended position corresponds to the rams 252 being in abutment.

In this extended position, the stresses experienced by the cascade grille 227 are transmitted directly to the fixed structure 206 and to the fan casing 301 via the contact between the cascade grille 227 and the, or each, stop element 550, which makes it possible to limit the size of the rams. Each ram is then subjected only to the frictional stresses of the mobile assembly 106 and to the stresses experienced by the blocking doors 104. Each compression spring 506 exerts a pressure on the cascade grille 227 against the, or each, stop element 550.

Furthermore, another portion of the stresses is transmitted to the fixed assembly via the stops of the rams.

Thus, for each cascade grille 227, the fixed structure 206 comprises at least one stop element 550 against which the cascade grille 227 abuts upon movement from the advanced position to the extended position, and wherein the, or each, stop element 550 is arranged to halt the cascade grille 227 before the mobile structure 211 reaches the extended position, that is to say, before the rams 252 come into abutment, i.e., also guaranteeing a functional clearance between each slide 502a-b and the associated front stop 504a, even when the mobile structure 211 reaches the extended position.

Similarly, in the extended position, there is a clearance between each slide 502a-b and the associated front stop 504a in order to guarantee the abutment of the cascade grille 227 against the, or each, stop element 550.

Thus, the continuation of the movement of the mobile structure 211 until the rams 252 are in abutment, after the contact between the cascade grille 227 and the, or each, stop element 550, allows the compression spring 506 to be compressed such as to achieve abutment of the cascade grille 227 on the, or each, stop element 550.

In the embodiment of the invention, each stop element 550 abuts against a front part of the cascade grille 227.

In the embodiment of the invention shown in FIGS. 3 to 5, each stop element 550 is integral with the interior wall 306.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan comprising a motor and a nacelle, surrounding the motor, and wherein a secondary duct for a secondary flow is delimited between the nacelle and the motor, the nacelle comprising:
    a fan casing comprising an exterior wall,
    a fixed assembly comprising a fixed structure forming an interior wall of the fan casing,
    a mobile assembly comprising a mobile cowl and a frame having openwork regions to the front of the mobile cowl, the mobile assembly being mobile in translation relative to the fixed structure in a direction of translation between an advanced position in which the mobile assembly is positioned such that the mobile cowl is moved close to and extends the exterior wall, and an extended position in which the mobile assembly is positioned such that the mobile cowl is moved away to a rear of the exterior wall so as to open a window between the secondary duct and an exterior of the nacelle, wherein the openwork regions are positioned across the window in the extended position,
    a plurality of blocking doors, wherein each blocking door is mounted to be mobile between a stowed position in which the blocking door is outside the secondary duct and a deployed position in which the blocking door extends across the secondary duct,
    an array of rams configured to move the mobile assembly in translation from the advanced position to the extended position, and vice versa, wherein the extended position corresponds to an abutment of the rams,
    at least one cascade grille mounted on the frame and arranged across the openwork region, wherein the at least one cascade grille is mounted to undergo a sliding movement on the frame parallel to the direction of translation,
    for the at least one cascade grille, at least one front stop limiting the movement of the cascade grille to the front and at least one rear stop limiting the movement of the cascade grille to the rear,
    for the at least one cascade grille, at least one compression spring that pushes back the cascade grille to the rear for abutment against the rear stop, and
    for the at least one cascade grille, the fixed structure comprises at least one stop element against which the cascade grille abuts upon movement from the advanced position to the extended position, and wherein the at least one stop element is arranged to guarantee a functional clearance between the cascade grille and the at least one front stop, even when the mobile assembly reaches the extended position.

2. The turbofan as claimed in claim 1, wherein the cascade grille comprises two front slides and two rear slides distributed at four corners of the cascade grille and mounted to slide on the frame, and wherein each slide is mounted to slide between a front stop arranged at a front relative to the slide and a rear stop arranged to a rear relative to the slide.

3. The turbofan as claimed in claim 2, wherein a link between each slide and the frame is formed as a clevis, with U-walls which form the front stops and the rear stop of the respective slide.

4. The turbofan as claimed in claim 2, wherein, for each front slide, the compression spring is arranged between the front stop and the front slide.

5. An aircraft comprising at least one turbofan as claimed in claim 1.

* * * * *